July 14, 1942.  H. N. PERELSON  2,289,677
RUBBER STOPPER
Filed Sept. 24, 1940    2 Sheets-Sheet 1
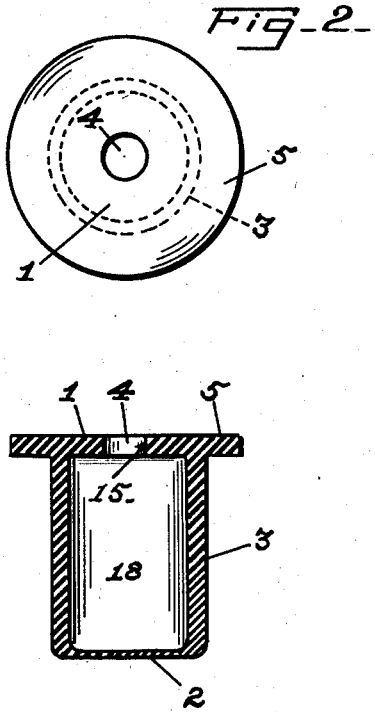
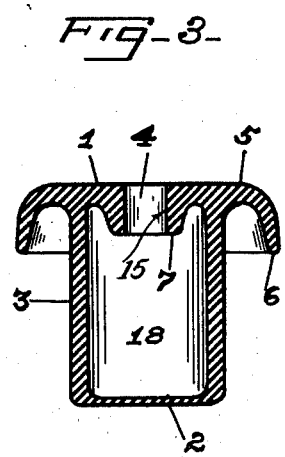
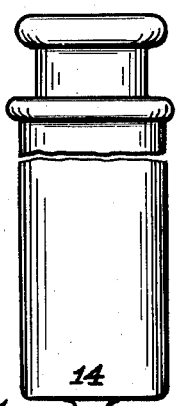
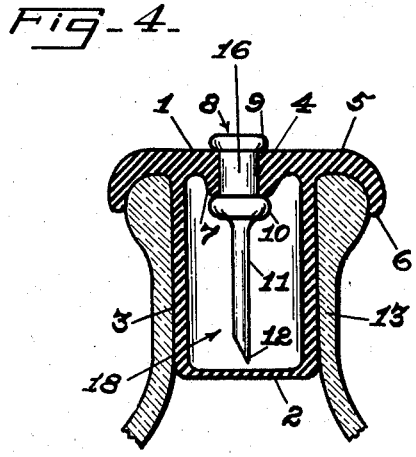
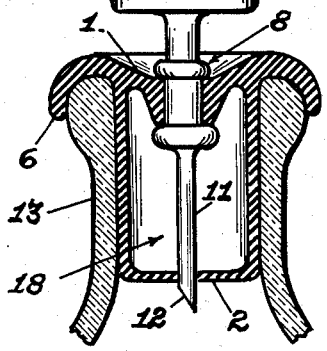
INVENTOR.
Harold N. Perelson July 14, 1942.   H. N. PERELSON   2,289,677
RUBBER STOPPER
Filed Sept. 24, 1940   2 Sheets-Sheet 2
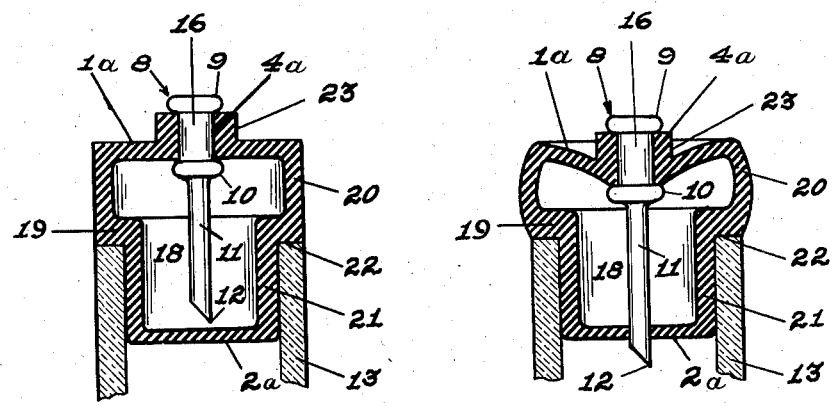
Fig-6-   Fig-8-   Fig-7-
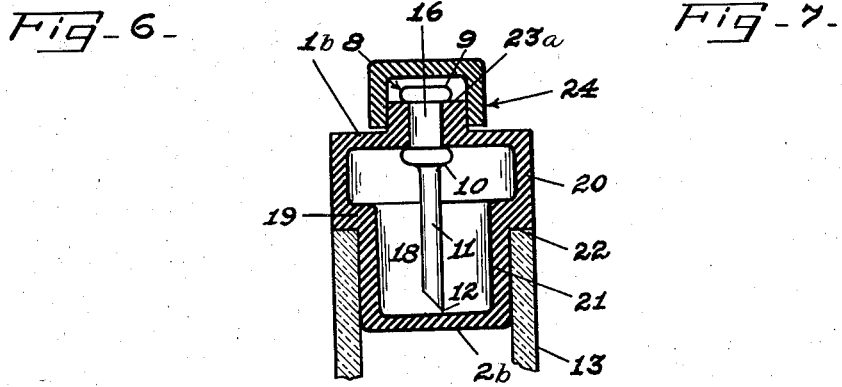
Fig-9-   Fig-10-
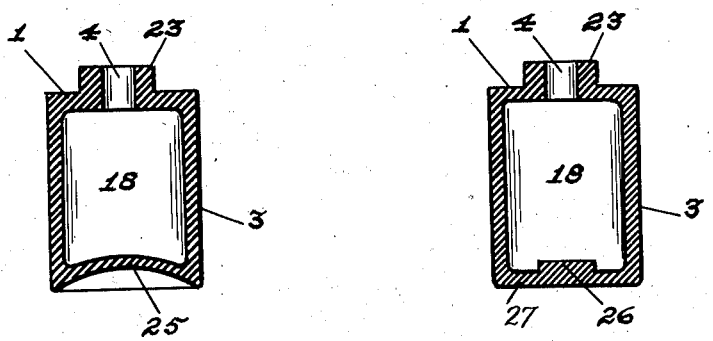
INVENTOR.
Harold N. Perelson Patented July 14, 1942

2,289,677

UNITED STATES PATENT OFFICE 2,289,677

RUBBER STOPPER

Harold N. Perelson, Huntington Park, Calif.

Application September 24, 1940, Serial No. 358,057

2 Claims. (Cl. 215—47)

My invention relates to improvements in rubber stoppers, used in sealing sterile solutions.

An important object of the invention is to permit the use of one hypodermic needle to remove fluid from a sealed bottle and to permit the use of another needle for injection of said fluid with a minimum of inconvenience.

In order to facilitate the rapid removal of solutions from sealed bottles, a large bore needle is used. Then a fine bore needle is substituted for the purpose of injection into a patient. In some instances, the hypodermic syringe is directly dipped into the solution and then a needle attached for injection. The device herein described makes such procedures unnecessary.

In accomplishing this and other objects of the invention, I have provided details of construction, the preferred forms of which are illustrated in the accompanying drawings, wherein—

Fig. 1 is a sectional view of the rubber stopper.

Fig. 2 is a top view of the rubber stopper.

Fig. 3 is a sectional view of the rubber stopper, in modified form.

Fig. 4 is a sectional view of the rubber stopper in position in a bottle and embodying a hypodermic needle.

Fig. 5 is a sectional view of the rubber stopper in position in a bottle showing the hypodermic needle connected with the syringe and depressed to penetrate the inner wall.

Fig. 6 is a sectional view of a second variant form of the rubber stopper in position in a bottle and embodying a hypodermic needle.

Fig. 7 is a sectional view of the form of Fig. 6 with the hypodermic needle depressed to penetrate the inner wall.

Fig. 8 is a sectional view of a third variant form of the rubber stopper embodying a hypodermic needle with a closure device.

Fig. 9 is a sectional view of a fourth variant form of the rubber stopper.

Fig. 10 is a sectional view of a fifth variant form of the rubber stopper.

In the drawings, wherein for the purpose of illustration are shown preferred embodiments of my invention, the numeral 1 represents the outer wall of the rubber stopper. The numeral 2 represents the inner imperforate wall which is connected with the outer wall by means of a cylindrical wall 3, thereby forming a chamber 18 the outer wall of which is provided with a central opening 4. A hypodermic needle 8 is mounted in the opening 4 and supported by the wall 1 so that the pointed end 12 of the shank 11 of the needle is normally disposed in approximation with the inner wall 2, in position to penetrate the inner wall when the needle is pushed inwardly. The hub 16 of the needle is engaged in the opening 4 and the outer end of the needle projects beyond the outer surface of the wall 1 so that it may be connected with a syringe as shown in Fig. 5.

The outer wall 1 of the stopper is provided with a bottle neck-engaging flange 5 which is straight as shown in Figs. 1 and 2 but may be provided with a downwardly curving extension 6 as shown in Figs. 3, 4 and 5 for effecting a better seal with the neck of the bottle.

The sidewall 15 of the opening 4 may, as shown in Figs. 3 and 4, be provided with a lip or boss 7 so as to more securely grip and hold the hypodermic needle 8 between shoulders 9 and 10 of the hub 16. This form is preferred for use with wide mouth bottles.

For narrow necked bottles, the embodiment shown in Figs. 6 and 7 is preferred. In these figures the numeral 1a represents the outer wall having a boss 23 through which the opening 4a extends. The numeral 2a represents the imperforate inner wall and the numeral 19 represents an annular intermediate wall which is connected with the outer wall by means of the cylindrical wall 20 and with the inner wall by means of the cylindrical wall 21. The intermediate wall 19 provides a shoulder 22 which abuts the bottle neck 13.

This modification allows of greater flexibility which is especially desirable for use with narrow necked bottles.

If the form shown in Figs. 1 to 5 is used in small necked bottles the rigidity of the outer wall 1; which is requisite to facilitate withdrawal of the needle point from the inner wall 2 and maintain the point 12 in proximity to said inner wall, hampers easy depression of the needle because of the small chord of depression. In the modification as shown in Figs. 6 and 7 this chord of depression is materially lengthened, allowing for greater facility in depressing the needle without sacrificing rigidity of the outer wall. It should be noted the needle 8 is supported by the outer wall 1a in the same manner as shown in Fig. 4.

In the form of my invention shown in Fig. 8 the outer wall 1b is provided with an apertured boss 23z adapted to support the needle 8. A cover 24 may be fitted on this boss to insure a seal for the needle 8 and the chamber within the stopper.

A further modification of the rubber stopper is shown in Fig. 9 wherein the inner wall 25 is concavo-convex with its convex side exposed to the chamber 18 to eliminate the tendency to repeatedly penetrate said wall at the same point and also strengthen the inner wall. These ends may be similarly attained as shown in Fig. 10 where a central boss 26 is formed on the inner surface of the inner wall 27. Any similar means of bringing within a closer range of the needle a larger area or blocking off a central area may be employed to accomplish the purposes of the walls 25 and 27 respectively.

Operation

A syringe 14 is attached to the hypodermic needle 8 as shown in Fig. 5 and pushed inward to depress the outer wall of the stopper whereby the needle will puncture the inner wall of the stopper as shown in Figs. 5 and 7 thus permitting the aspiration of the contents of bottle. The syringe is then pulled outward withdrawing the needle 8 to the interior of the chamber 18. The syringe 14 is detached from the needle and another hypodermic needle of appropriate size (not shown) is attached for use. The material of the inner wall is such that the puncture is automatically closed when the needle is withdrawn.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

I claim:

1. A bottle stopper including a body of resilient material provided with an interior chamber having inner and outer walls constituting the inner and outer ends of the stopper; a hollow needle carried by said outer wall with its outer end exposed for connection with a syringe and its inner end disposed in said chamber in position to be extended through and retracted from said inner wall; and means holding said needle in said outer wall so that when the needle is extended through the inner wall the outer wall will be depressed and when the needle is retracted the outer wall will be likewise retracted and thereby hold the inner end of the needle within said chamber.

2. A bottle stopper including a body of resilient material provided with an interior chamber having inner and outer walls constituting the inner and outer ends of the stopper, a hollow needle carried by said outer wall with its outer end exposed for connection with a syringe and its inner end disposed in said chamber in position to be extended through and retracted from said inner wall; and a boss on said outer wall for surrounding and gripping said needle.

HAROLD N. PERELSON.